United States Patent

[11] 3,593,354

| [72] | Inventor | John Henry Carter<br>Weston, Mass. |
|---|---|---|
| [21] | Appl. No. | 847,031 |
| [22] | Filed | Aug. 4, 1969 |
| [45] | Patented | July 20, 1971 |
| [73] | Assignee | Aeromarine Corporation<br>Weston, Mass. |

[54] BOAT HULL CONSTRUCTION
4 Claims, 9 Drawing Figs.

| [52] | U.S. Cl. | 9/6 |
|---|---|---|
| [51] | Int. Cl. | B63b 5/02 |
| [50] | Field of Search | 9/6, 65 |

[56] References Cited
UNITED STATES PATENTS

| 2,758,321 | 8/1956 | Westfall | 9/6 |
|---|---|---|---|
| 3,080,267 | 3/1963 | Schmalz | 9/6 (X) |
| 3,093,847 | 6/1963 | Strecker | 9/6 |
| 3,174,166 | 3/1965 | Ehrenberg et al. | 9/6 |
| 3,176,055 | 3/1965 | Loos | 9/6 (X) |

Primary Examiner—Trygve M. Blix
Assistant Examiner—Carl A. Rutledge
Attorney—Martin Kirkpatrick ABSTRACT: A sandwich construction for a boat hull incorporating integrally molded ribs having high strength at points remote from the outer hull surface and thereby providing a large structural moment resistant to distortion and failure under load or impact, lightweight for a given strength, and economy of fabrication.

BOAT HULL CONSTRUCTION

The invention relates to hull construction.

It is an object of the invention to provide a hull having the known advantages of sandwich construction together with a greatly increased structural moment. Other objects are to provide such a hull which is relatively light in weight for a given strength and which is adapted to rapid and economical quantity production.

The invention features a continuous inner skin indented at a plurality of rib stations, integrally molded elements of high tensile strength adjacent the inner extremities of the indentations, and preferably further includes filler material within the indentations and between the inner skin and an outer skin.

In preferred embodiments, the inner and outer skins are molded of resin-impregnated fiberglass laminate, the elements of high-tensile strength are glass rovings oriented parallel to the rib lines, the filler material within the indentations is a balsa wood rib core, and the filler material between the inner and outer skins is a layer of contiguous balsa wood blocks with the grain orientation generally perpendicular to the hull surface.

Other objects, features, and advantages will appear from the following description of a preferred embodiment of the invention taken together with the attached drawings in which.

Figure 1:
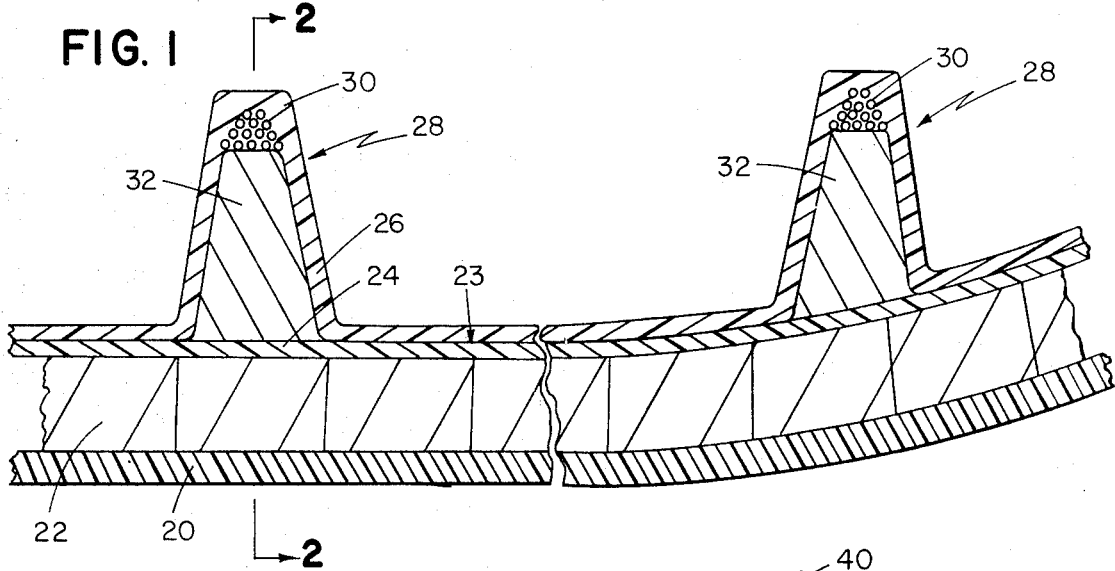
FIG. 1 shows a portion of the hull structure in section.

FIG. 1 shows in section a portion of a hull structure constructed in accordance with the invention. Outer skin 20 is formed of a resin-impregnated fiberglass laminate. For a relatively large boat hull (e.g. 50 feet L.O.A.) a typical outer skin thickness would be about three-sixteenths of an inch, but it should be understood that this dimension, like the other dimensions specified herein are exemplary only and should be varied in accordance with the hull size, the rib spacing, and the desired structural characteristics of the finished hull. Within the outer skin, and bonded to it is a layer of low-density filler 22, for example, contiguous balsa wood blocks of ½-inch thickness having a grain orientation generally perpendicular to the hull surface. (Ready-assembled mats of such blocks are commercially available.) A continuous inner skin 23, also formed of resin-impregnated fiberglass laminate about three-sixteenths of an inch thick is bonded to the inner surface of filler 22. An inner portion 26 of that inner skin is indented to form transverse ribs 28. Adjacent the inner end of each rib is a skein of high-tensile strength reinforcing elements, for example, glass rovings 30, encapsulated in a suitable binder such as a polyester resin. A rib core 32 fills the remainder of the rib and is separated from filler layer 22 by outer portion 24 of inner skin 23. The rib core is bonded to both the inner and outer portions (26 and 24) of inner skin 23 and may be conventionally formed of balsa wood or other material of suitable strength and weight. (The average density of the core should normally be lower than that of the inner skin to yield the best strength-to-weight characteristics for the hull.)

Figure 2:
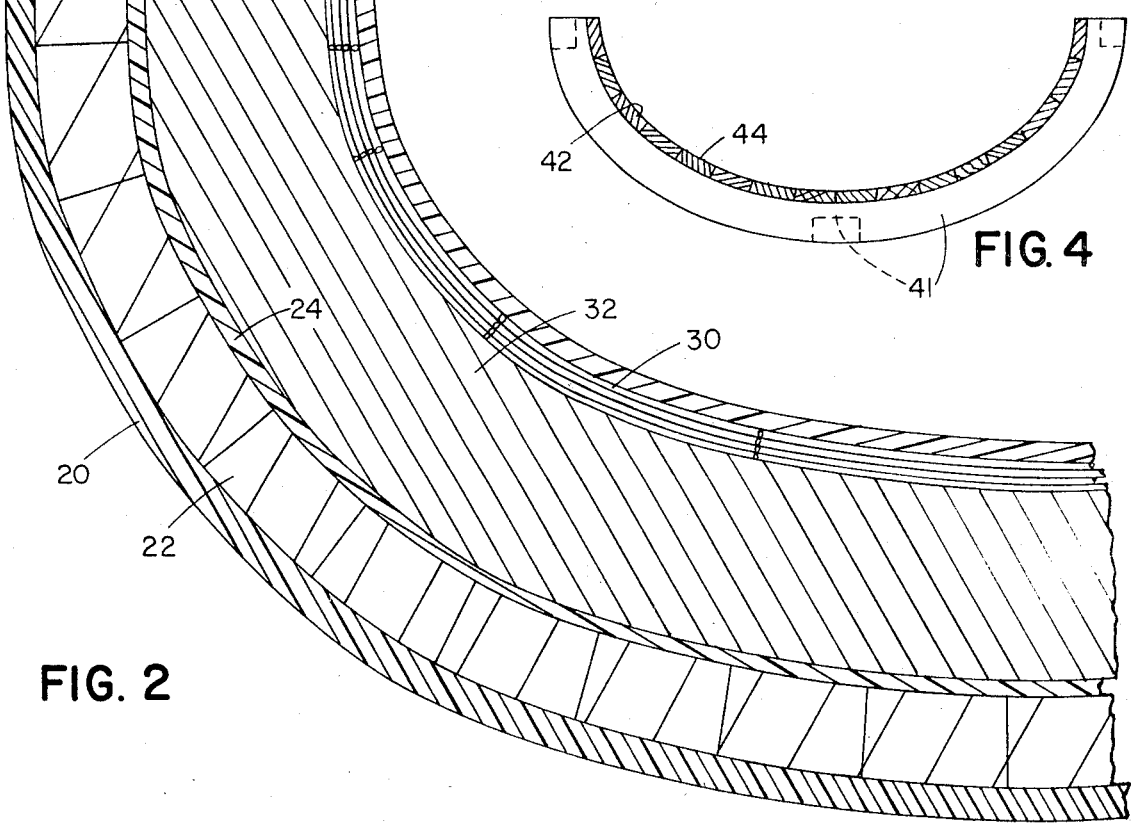
FIG. 2 is another sectional view of the hull structure taken on line 2-2 of FIG. 1.

In FIG. 2 is shown another sectional view of the same hull construction taken on line 2-2 of FIG. 1. This view is perpendicular to the hull centerline and shows the interior of a segment of a single rib 28. Reinforcing elements 30 are oriented generally parallel to the curvature of the rib. This form of hull construction provides a very high strength-to-weight ratio. The moment between the high-tensile strength elements 30 and the outer surface of the hull is large—preferably the elements 30 are concentrated in the outer quarter of the rib 28. (The rib itself is preferably deeper than the dimension between the outside of outer skin 20 and the inside of inner skin 23.)

Figure 3:
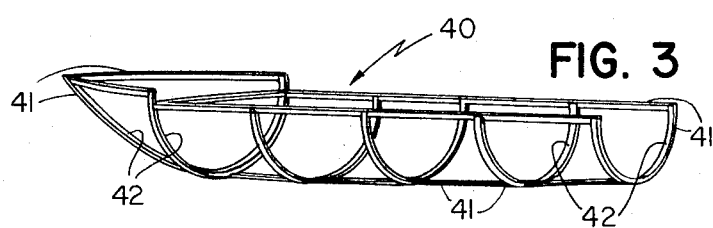
FIG. 3 shows a framework for constructing a female mold.
Figure 4:
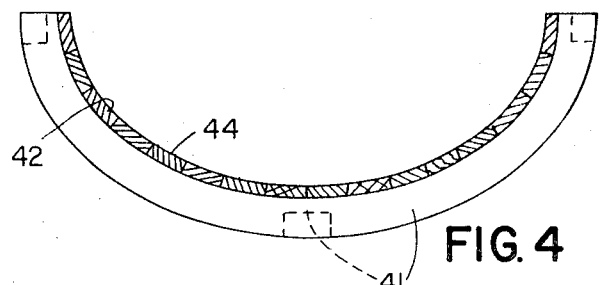
FIG. 4 shows the framework of FIG. 3 in end view with internal planking added.

The applicant has originated a rapid and economical method of fabricating hulls of varied configuration employing the construction of FIG. 1. First, as shown in FIG. 3, an exterior or skeleton 40 is constructed. The interior surfaces 42 of the members 41 making up this skeleton conform to the exterior surface of the finished hull. These interior surfaces are planked as shown in FIG. 4 with planking 44 chosen to have the same thickness as the finished hull (that is the thickness from the inside of inner skin 23 to the outside of outer skin 20). This planking forms the surface of a female mold which is used to fabricate a male mold used in turn to fabricate the actual hull.

Figure 5:
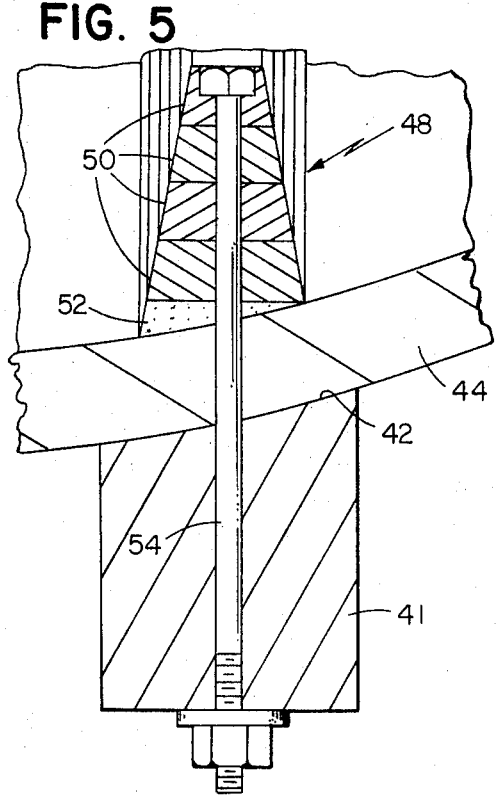
FIG. 5 shows a portion of the female mold including a rib former.
Figure 6:
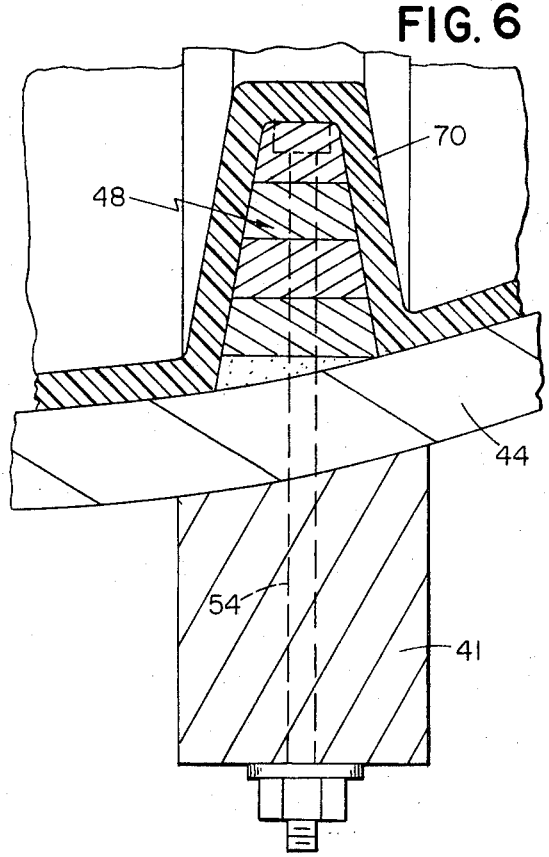
FIG. 6 shows the manner in which a male mold is formed upon the inner surface of the female mold.
Figure 7:
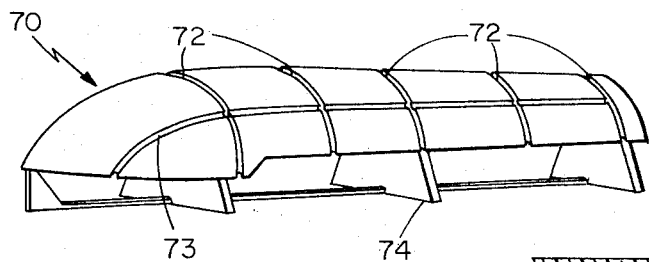
FIG. 7 shows the completed male mold.
Figure 8:
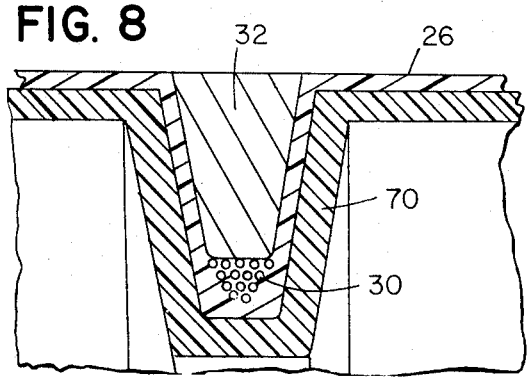
FIG. 8 shows the initial elements of the hull construction in place upon the male mold.

Rib formers 48 are next added to the interior of the planking 44 (as shown in FIG. 5). These formers are conveniently built up from laminated wood layers 50. The orientation of the rib formers is perpendicular to the hull centerline; they may be bolted in place as by bolts 54. If the hull surface is at an appreciable angle to the centerline, it is desirable to add filler material 52 to seal the gap between the outermost lamina of the rib former and the planking 44. The rib formers can have any desired orientation, spacing, and size, need not be confined to transverse members, but can also be used to form a keel, longitudinal stringers, or other reinforcing channels. Once the rib formers are in place, a male mold 70 can be laid up as shown in FIG. 6. The male mold can be of fiberglass laminate, plastic, concrete, or any other moldable material of sufficient strength and rigidity. Naturally the choice of material and other features of the mold construction will depend to some extent on cost considerations. If the mold is to be used to construct a great number of hulls, a more durable structure is economically justified than if the construction is for only one or a few hulls.

When the male mold has cured, the rib formers 48 and the planking 44 may be removed. This will leave the completed male mold 70, conforming to the exact contours of the inner surface of inner skin 23 of the finished hull, with grooves 72 coinciding with the location of the ribs 28. (Longitudinal groove 73 provides for a longitudinal stringer.) The male mold 70 may be conveniently inverted and mounted on a base structure 74 in position to commence construction of the finished hulls.

Hull construction is simple and economical. The male mold 70 is first prepared by coating with a suitable lubricant to prevent the unwanted adhesion of the mold to the hull. (It may be desirable to cut the mold into sections and then reassemble it with internal braces in order to facilitate removal from the finished hull; this, of course, depends upon the hull geometry and upon the configuration of the ribs.)

The inner portion 26 of inner skin 23 is first laid up in a continuous layer over the entire mold, being indented into the grooves 72 (and 73) for forming the ribs. Next the reinforcing elements 30 are laid into the bottoms of the grooves, oriented parallel with the groove axes, and are encapsulated in a suitable bonding agent. Rib fillers 32 are placed against the bonded reinforcing elements and laminated to the surface of inner portion 26 of inner skin 23.

Figure 9:
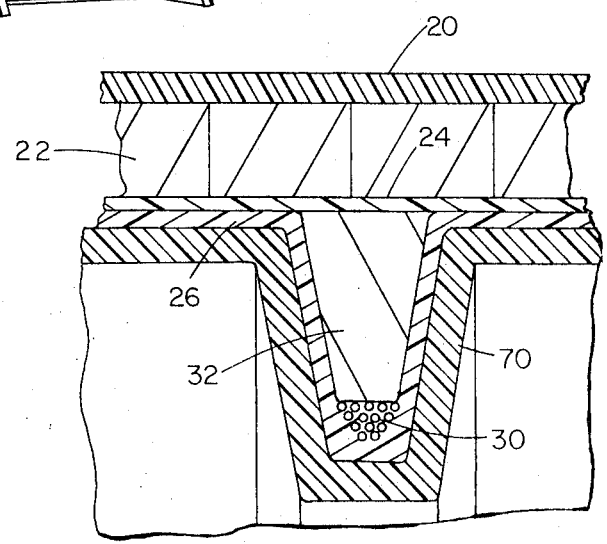
FIG. 9 shows the completed hull construction in place upon the male mold.

Next the outer portion 24 of inner skin 23 is laid up as shown in FIG. 9, and filler material 22 is laminated to the outside of outer portion 24 (FIG. 9). Finally the outer skin 20 is laid up over the filler material 22 and laminated to it. The rib fillers 32 and filler material 22 are of balsa wood in the preferred embodiment, but other low-density materials (for example, moldable unicellular plastic foam materials) may also be thus employed and the materials used for the skins and reinforcing elements may likewise be varied in accordance with the requirements of a specific application without departing from the concept of the invention. Other embodiments will occur to those skilled in the art and are within the following claims.

What I claim is:

1. A hull construction comprising:
   a molded continuous outer skin having an outer surface defining a hull surface;
   a layer of filler material of lower density than said outer skin bonded within said outer skin;
   a molded continuous inner skin of higher density than said layer of filler material, bonded within said layer of filler material;
   portions of said inner skin being inwardly indented to form reinforcing channels;
   elongated, thin, high-tensile strength elements encapsulated in a bonding agent in said channels near the inner extremities thereof; and
   core elements of lower density than said inner skin encapsulated within said channels and bonded thereto.

2. The hull construction of claim 1 wherein said elements of high-tensile strength are glass rovings encapsulated in a bonding agent.

3. The method of constructing a hull with integrally molded reinforcing channels including the steps of:
   producing a male mold having channel indentations upon the outer surface thereof,
   laying up a first portion of an inner skin of said hull upon said male mold and indenting said portion to conform to said channel indentations,
   adjacent the inner extremities of said channel indentations bonding elements of high-tensile strength,
   inserting core elements of lower density than said inner skin within said channel indentations and bonding them to the interior thereof,
   laying up a second portion of said inner skin outside said first portion and said core elements and bonding it thereto.

4. The method claimed in claim 3 further including the steps of:
   laying up filler material of lower density than said inner skin upon the outside of said second portion of said inner skin and bonding it thereto,
   laying up an outer skin of greater density than said filler material outside said filler material and bonding it thereto.